(12) United States Patent  (10) Patent No.: US 7,788,046 B2
Schmalzried et al.  (45) Date of Patent: Aug. 31, 2010

(54) METHOD FOR OPERATING A MAGNETO-INDUCTIVE FLOW MEASURING DEVICE

(75) Inventors: Frank Schmalzried, Freising (DE); Wolfgang Drahm, Freising (DE)

(73) Assignee: Endress + Hauser Flowtec AG, Reinach (CH)

( * ) Notice: Subject to any disclaimer, the term of this patent is extended or adjusted under 35 U.S.C. 154(b) by 89 days.

(21) Appl. No.: 12/078,225

(22) Filed: Mar. 28, 2008

(65) Prior Publication Data

US 2008/0250867 A1  Oct. 16, 2008

Related U.S. Application Data

(60) Provisional application No. 60/996,748, filed on Dec. 4, 2007.

(30) Foreign Application Priority Data

Mar. 28, 2007  (DE)  ........................ 10 2007 015 368

(51) Int. Cl.
*G01F 19/00* (2006.01)
(52) U.S. Cl. ........................................ 702/45
(58) Field of Classification Search ............... 702/45; 73/861.11, 861.12, 861.13, 861.14, 861.15, 73/861.16, 861.17
See application file for complete search history.

(56) References Cited

U.S. PATENT DOCUMENTS

| | | | |
|---|---|---|---|
| 6,505,517 B1 | 1/2003 | Eryurek | |
| 6,611,770 B1 | 8/2003 | O'Donnell | |
| 2004/0027132 A1* | 2/2004 | Budmiger | ............... 324/439 |
| 2005/0109120 A1* | 5/2005 | Turner | ..................... 73/861.12 |
| 2008/0288933 A1* | 11/2008 | Budmiger et al. | ........... 717/168 |

FOREIGN PATENT DOCUMENTS

| | | |
|---|---|---|
| DE | 101 18 002 A1 | 10/2002 |
| DE | 10 2004 031 638 A1 | 1/2006 |

(Continued)

*Primary Examiner*—Aditya Bhat
(74) *Attorney, Agent, or Firm*—Bacon & Thomas, PLLC

(57) ABSTRACT

A medium to be measured is allowed to flow through a measuring tube of a flow meter and a magnetic field passing at least sectionally with a time-varying intensity through the medium in the measuring tube is produced in such a manner that a measurement voltage is induced at least at times, especially in a clocked manner, in the medium. The measurement voltage induced in the medium is tapped, at least at times, by means of an electrode pair formed by first and second measuring electrodes for producing an analog measurement signal corresponding with the measurement voltage, and a flow-type of the medium located in the measuring tube, as determined by an instantaneous flow profile and/or an instantaneous composition of the flowing medium, is ascertained with application of a digital signal representing the at least one measurement signal. Starting on the basis that the measurement signal has a wanted-portion corresponding essentially with an instantaneous flow velocity of the medium and a noise portion influenced at least partially by existent disturbances in the flowing medium, ascertained are: a noise spectrum of the measurement signal corresponding with the noise portion; and, with application at least of a part of the noise spectrum, a state value signaling, at least qualitatively, at least one flow-type present in the measuring tube.

35 Claims, 12 Drawing Sheets

FOREIGN PATENT DOCUMENTS

| | | |
|---|---|---|
| DE | 10 2005 018 179 A1 | 10/2006 |
| DE | 10 2005 028 723 A1 | 12/2006 |
| EP | 0 521 448 A | 1/1993 |
| EP | 1 273 892 A | 1/2003 |
| EP | 1 275 941 A1 | 1/2003 |
| GB | 2 324 606 A | 10/1998 |
| WO | WO 96/37758 A | 11/1996 |
| WO | WO 01/90702 A2 | 11/2001 |
| WO | WO 2004/109416 A | 12/2004 |

* cited by examiner

METHOD FOR OPERATING A MAGNETO-INDUCTIVE FLOW MEASURING DEVICE

CROSS-REFERENCE TO RELATED APPLICATION

This application is a Nonprovisional Application claiming the benefit of U.S. Provisional Application No. 60/996,748, which was filed on Dec. 4, 2007, which claims the benefit of German Application DE 10 2007 015368.8 which was filed on Mar. 28, 2007.

TECHNICAL FIELD

The invention relates to a method for operating a magneto-inductive flow-measuring device. Especially, the invention relates to a method for ascertaining a flow-type of a medium flowing through the flow measuring device.

BACKGROUND DISCUSSION

In industrial process measurements technology, magneto-inductive flow transducers are often used, especially in connection with automating chemical and/or materials-treatment processes, for measuring flow of electrically conductive media. As is known, magneto-inductive flow measuring devices permit primarily practically direct measurement of a time-varying flow velocity and/or time-varying volume flow of an electrically conductive liquid and the mapping of such into corresponding, primary, measured values. Structure and manner of operation of magneto-inductive flow measuring devices are known per se to those skilled in the art and are described extensively and in detail, for example, in DE-A 43 26 991, EP-A1 275 940, EP-A 12 73 892, EP-A 1 273 891, EP-A 814 324, EP-A 770 855, EP-A 521 169, U.S. Pat. No. 6,962,087, U.S. Pat. No. 6,973,839, U.S. Pat. No. 6,634,238, U.S. Pat. No. 6,031,740, U.S. Pat. No. 5,487,310, U.S. Pat. No. 5,210,496, U.S. Pat. No. 4,410,926, US-A 2002/0117009 or WO-A 01/90702.

Flow transducers of the described kind have, usually, a non-ferromagnetic measuring tube, which is inserted liquid-tightly, e.g. by means of flanges or screwed fittings, into the course of a pipeline conveying, during operation, the medium to be measured.

The medium flows through the measuring tube. The part of the measuring tube contacted by the medium is, in general, embodied to be electrically non-conducting, in order that a measurement voltage not be short-circuited, such as is induced in the medium according to Faraday's law of induction by a magnetic field of time-varying intensity passing, at least sectionally, through the measuring tube. Metal measuring tubes are, therefore, usually provided internally with an electrically non-conducting layer, e.g. of hard rubber, polyfluoroethylene or some other type of plastic. In the case of measuring tubes made completely of plastic or ceramic, for example aluminum oxide ceramic, such do not, in contrast, require the electrically non-conducting layer.

The magnetic field is produced by means of a magnet system designed therefor, coupled appropriately into the flowing medium. Such a magnet system is formed, most often, by means of two field coils placed externally on the measuring tube, lying diametrally opposite to one another. If necessary, field coils of the described kind have coil cores of a magnetically conductive material serving for guiding the magnetic field. In order that the magnetic field produced by the coils is as homogeneous as possible, the coils are, most often, identical to one another and electrically connected in series, so that the same exciter current flows through them both during operation. A practice has, however, also already been described, wherein an exciter current is allowed to flow alternately with the same sense and then with opposite sense through the field coils, in order, in this way, to be able to ascertain, for example, the viscosity of liquids, their flow index and/or a degree of turbulence of the flow; compare, in this connection, also EP-A1 275 940, EP-A 770 855 or DE-A 43 26 991. The aforementioned exciter current is produced by a corresponding operating electronics of the flow meter and can be e.g. in the form of a clocked, pulsed or harmonic, alternating current. For producing clocked exciter currents, usually switching circuits acting as rectangular modulators, for example in the form of a T- or H-circuit, are used, through which an electrical current, usually controlled to constant amplitude, flows.

The mentioned, induced, measurement voltage is tapped by means of at least two, galvanic (thus, contacting the measured medium) or capacitive (thus, e.g. arranged within the tubular wall of the measuring tube), measuring electrodes. In the most frequent case, the measuring electrodes are so arranged, lying diametrally opposite to one another, that the diameter common to them is perpendicular to the direction of the magnetic field and, thus, perpendicular to the diameter on which the field coils lie opposite to one another. The induced measurement voltage is received by means of a suitable signal processing circuit of the flow meter, appropriately amplified, and turned into a largely conditioned, measurement signal, which can then, in turn, be appropriately further processed, for example digitized. Appropriate signal processing circuits are likewise known to those skilled in the art, especially from EP-A 814 324, EP-A 521 169 or WO-A 01/90702.

In principle, the absolute values of the instantaneous potentials on the electrodes are unimportant for measuring volume flow. Of course, they do, on the one hand, have to lie in the design range of a difference amplifier following on the measuring electrodes, i.e. thus this amplifier must not be overdriven by the potentials, and, on the other hand, their frequency of change must lie significantly below the frequency of the mentioned electrical current direction reversal.

The potential at each electrode depends not only on characteristics of the measuring tube and the magnetic field system. As already discussed in U.S. Pat. No. 6,708,569 or also in U.S. Pat. No. 6,634,238, practically unavoidable disturbances of various origins can be superimposed on each of the potentials and, as a result, also on the actual measurement signal. Such disturbances of the measurement signal can be caused, for example, by inductive and/or capacitive incursions into the measurement lines or coatings on the measuring electrodes.

Besides those disturbances more attributable to the excitation- and measurement-channels, it can further be assumed that also the type of flow of the medium in the measuring tube can, itself, have a considerable influence on the characteristics of the measurement signal and that deviations from the calibrated and, thus, specified, flow conditions are likewise to be viewed as a significant source of disturbance of the measurement signal. A first type of flow-related disturbance arises in the case of media burdened with foreign matter such as entrained solid particles and/or gas bubbles and occurs when such foreign matter collides with at least one of the measuring electrodes or flows past in the immediate vicinity thereof and effects sudden changes of the local potential. The decay time of these changes depends on the type of medium and is, most often, greater than the rise time of the changes. A second type of flow-related disturbance of the measurement signal can, as also discussed in DE-A 43 26 991, be attributed to asymmetries in a flow profile first assumed to be symmetrical. As a result of the aforementioned disturbances, in the final analysis, one must assume that the measurement signal has not only a wanted portion corresponding essentially to an instantaneous flow velocity of the medium, but, also, most often, a noise portion at least proportionately influenced by present-time disturbances in the flowing medium and that this noise portion can, in turn, contribute, to a significant degree, to a degradation of the measurement result.

In EP-A 1 273 892, there is disclosed a method for operating a magneto-inductive flow transducer, wherein disturbance potentials on the measuring electrodes, especially also those which are flow-related, are eliminated or at least markedly reduced in their effect by applying to at least one of the two measuring electrodes, at least at times, voltage pulses produced by means of the evaluating and operating circuit. Use of this method can lead to a significant improvement of the measuring accuracy of magneto-inductive flow meters, especially in the case of single phase or also well mixed, multiphase liquids. Moreover, methods are described, for example in EP-A 337 292 or WO-A 03/004977, wherein the measuring electrodes are supplied over a longer period of time with an erasing voltage eliminating disturbance potentials, especially by clocked short-circuiting to ground or by application of a harmonic, alternating voltage. However, a disadvantage of this measuring method and corresponding flow transducers is that, for example, in the case of multiphase liquids with marked separation of the individual liquid phases or in the case of porridge-like, viscous liquids, one must contend with a more stochastic, initially practically no longer sensibly estimatable and thus also scarcely calibratable distribution and/or appearance-frequency of the possibly entrained solid particles or gas bubbles. In corresponding measure, thus, at least disturbance potentials of a flow-related nature can no longer be removed to a sufficiently certain degree from the measuring electrodes. Along with this, the measurement accuracy of the measuring device can quite significantly degrade, especially in the presence of increasing concentration of solid particles and/or gas bubbles.

SUMMARY OF THE INVENTION

It is therefore an object of the invention to provide a method with which disturbance potentials coupled into the measurement signals of magneto-inductive flow measuring transducers, especially also disturbance potentials arising from the type of flow or abrupt changes of the same, can at least be safely recognized, and correspondingly signaled, if required, in the form of an alarm. Additionally, the influence of such disturbance potentials on the ascertaining of the primary measured values should be canceled as much as possible, such that the primary measured values can be determined very precisely and reliably as before, also in the case of asymmetrical flow profile and/or in the case of multi-phase fluid or changes of its composition and/or its flow index.

To achieve this object, the invention resides in a method for operating a magneto-inductive flow meter, wherein the method includes the following steps:

allowing the medium to be measured to flow through a measuring tube of the flow meter;

producing a magnetic field, especially a clocked magnetic field, passing at least sectionally through the medium in the measuring tube at least sectionally with intensity varying as a function of time, in such a manner that a measurement voltage is induced, at least at times, especially in a clocked manner, in the medium;

tapping, at least at times, especially in a clocked manner, by means of an electrode pair formed by first and second measuring electrodes, the measurement voltage induced in the medium, for producing at least one analog measurement signal corresponding with the measurement voltage, wherein the measurement signal has a wanted portion essentially corresponding with an instantaneous flow velocity of the medium and a noise portion influenced, at least in part, by extant disturbances in the flowing medium; and ascertaining a flow type of the medium located in the measuring tube, as determined by an instantaneous flow profile and/or an instantaneous composition of the flowing medium.

Additionally, in the method of the invention, the step of ascertaining the flow type includes the following further steps:

producing a digital signal representing the at least one measurement signal;

ascertaining, with application of the digital signal, a noise spectrum of the measurement signal, especially a band-limited noise spectrum, corresponding at least predominantly with the noise portion; and ascertaining, with application at least of a part of the noise spectrum, at least one state value signaling at least qualitatively, especially as near-in-time as possible, the flow-type present in the measuring tube.

In a first embodiment of the method of the invention, the step of ascertaining the noise spectrum of the measurement signal further includes a step of separating the wanted and noise portions.

In a second embodiment of the method of the invention, it is provided that the separating of wanted and noise portions takes place, at least in part, with application of the digital signal.

In a third embodiment of the method of the invention, the step of ascertaining further includes a step of ascertaining, with application of the digital signal, a wanted/noise spectrum of the measurement signal corresponding both to the noise portion as well as also to the wanted portion of the measurement signal. In a further development of this embodiment of the invention, the step of the ascertaining the noise spectrum of the measurement signal further includes a step of removing from the wanted/noise spectrum a wanted spectrum of the measurement signal corresponding at least predominantly with the wanted portion. In such case, it is further provided that the wanted/noise spectrum is subjected to a median filtering for removing the wanted spectrum from the wanted/noise spectrum.

In a fourth embodiment of the method of the invention it is provided that the step of ascertaining the at least one state value includes a step of ascertaining a spectral power density at least of the noise portion of the measurement signal. In a further development of this embodiment of the invention, the ascertaining of the spectral power density at least of the noise portion of the measurement signal includes application of at least a part of the noise spectrum.

In a fifth embodiment of the method of the invention, it is provided that the step of ascertaining the at least one state value includes a step of ascertaining at least one model-parameter for the measurement signal, wherein the model-parameter currently represents a signal characteristic of the noise portion within the total noise spectrum. In a further development of the invention, the step of ascertaining the at least one state value further includes a step of comparing the model-parameter with a model reference value predetermined therefor and/or the at least one model-parameter represents a spectral power density of the noise portion.

In a sixth embodiment of the method of the invention, it is provided that the noise spectrum has a lower frequency band portion lying beneath a current, or present-time, reference frequency, especially a reference frequency which is changeable and/or influenced by the flow-type of the medium, wherein within which lower frequency band portion the noise portion currently exceeds, at least on average, a predetermined minimum level, as well as an upper frequency band portion lying above the reference frequency, wherein within the upper frequency band portion the noise portion currently falls below, at least on average, the predetermined minimum level. In a further development of this embodiment of the invention, the step of ascertaining the at least one state value includes a step of ascertaining the current reference frequency and/or the step of ascertaining the at least one state value further includes a step of ascertaining at least one model-parameter distinguishably representing the upper frequency band portion from the lower frequency band portion, and, on occasion, additionally also a step of comparing the existent model-parameter with a reference value predetermined therefor. The at least one state value can be determined with application of the current reference frequency and the model-parameter representing the upper frequency band portion and wherein at least one model-parameter can be a gradient value representing a frequency-dependent change of the spectral amplitude density of the noise portion.

In a seventh embodiment of the method of the invention, it is provided that the noise spectrum is band-limited.

In an eighth embodiment of the method of the invention, such further includes a step of subjecting at least a section of the digital signal to a discrete Fourier transformation.

In a ninth embodiment of the method of the invention, it is provided that the step of ascertaining the noise spectrum of the measurement signal further includes a step of subjecting at least a section of the digital signal to a discrete Fourier transformation. In a further development of this embodiment of the invention, the step of ascertaining the noise spectrum of the measurement signal further includes a step of ascertaining, on the basis of the digital signal, a wanted spectrum of the measurement signal corresponding at least predominantly with the wanted portion.

In a tenth embodiment of the method of the invention, it is provided that the state value signals that the medium has at least one fluid phase.

In an eleventh embodiment of the method of the invention, it is provided that the state value signals that the medium is essentially of one phase.

In a twelfth embodiment of the method of the invention, it is provided that the state value signals that the medium is multiphase, for example essentially two-phase and/or has essentially two fluid phases. Additionally, the state value can be so embodied that it signals that the medium has at least one gaseous phase and one liquid phase.

In a thirteenth embodiment of the method of the invention, such further includes a step of producing, on the basis of the measurement signal, at least one measured value quantitatively representing a measured variable to be ascertained for the measured medium. In a further development of this embodiment of the invention, the measured value is produced also by application of the digital signal, especially also with application of the state value.

In a fourteenth embodiment of the method of the invention, such further includes a step of comparing the state value with at least one predetermined state reference value representing a predetermined flow-type of the medium, especially one required for a safe operation and/or a predetermined measurement accuracy of the flow meter. In a further development of this embodiment of the invention, such further includes a step of triggering an alarm based on a comparison of the state value with at least one predetermined state reference value, wherein the alarm signals, especially in a visually and/or acoustically perceptible manner, that the currently ascertained flow-type deviates from the predetermined flow-type.

In a fifteenth embodiment of the method of the invention, it is provided that the step of producing a magnetic field, especially a clocked magnetic field, of time varying intensity passing at least sectionally through the medium in the measuring tube includes a step of permitting an electric, especially bi-polar, exciter current to flow through an operating circuit of the flow meter as well as through a magnetic field system arranged at the measuring tube and connected at least temporarily to the operating circuit.

In a sixteenth embodiment of the method of the invention, it is provided that the step of ascertaining the noise spectrum of the measurement signal further includes a step of storing at least a part of the digitally sampling sequence for producing a dataset instantaneously representing the measurement signal as a function of time within a predeterminable time interval.

A basic idea of the invention is to detect the partially, to a high degree, variable flow-type of the medium located in the measuring tube on the basis of disturbance potentials corresponding thereto in at least one measurement signal. To this end, a spectral analysis of a noise portion is performed on the basis of a noise spectrum of the measurement signal separated from the wanted portion of the measurement signal and corresponding with the disturbance potentials.

The invention is based, in such case, on the surprising discovery that disturbance potentials of the described kind do arise usually in a manner which is non-determined to a high degree but, nevertheless, the noise portions, thus the signal components isolated from the wanted portion of the measurement signal actually needed for production of the primary measured values, have, at least in the spectral region, most often a typical wave form, or typical shape, while the total spectrum of the measurement signal, here referred to as the wanted/noise spectrum, reflects disturbances of the kind discussed here only to an inferior, insufficient degree. Based on the noise spectrum, it is thus possible to detect with certainty during operation at least the presence of a disturbance damaging for the primary measurement, and, as a result, to perform online an identification of an instantaneous flow-type.

BRIEF DESCRIPTION OF THE DRAWINGS

The method of the invention and further advantages will now be discussed in greater detail on the basis of plots as a function of time, timing diagrams and schematic circuit diagrams for a magneto-inductive flow meter, as such are presented in the drawing, the figures of which show as follows:

FIGS. 54a and 5b: show, schematically, waveforms and plots as a function of time of potentials measurable during operation of the process measuring device of FIGS. 1a, 1b;

FIG. 6b shows a noise spectrum obtained on the basis of a median filtering of the wanted/noise spectrum of FIG. 6a;

DETAILED DISCUSSION

Figure 1A:
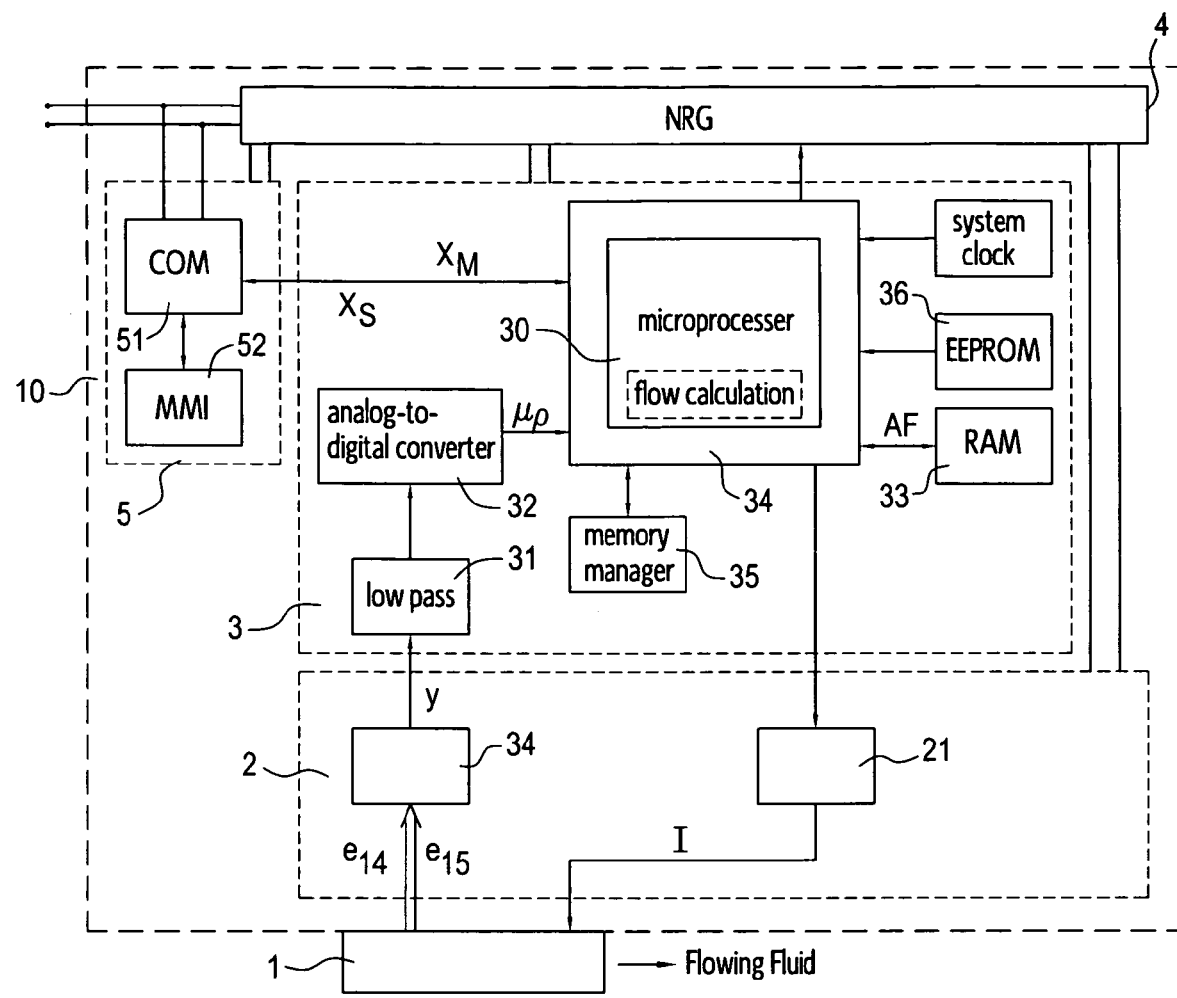
FIGS. 1a, and 1b show schematically and partially as block diagrams, a process measuring device, here embodied as a magneto-inductive flow measuring device, suitable for performing the method of the invention.

FIGS. 1a and b show, schematically and partially in the form of block diagrams, a process measuring device, here embodied as a magneto-inductive flow measuring device, suitable for performing the method of the invention. By means of such device, at least one physical, measured variable of a medium flowing in a pipeline, especially a two, or more, phase medium and/or a medium variable in composition and/or flow profile, can be registered. For example, the flow measuring device can be used for measuring a volume flow, e.g. volume flow rate, and/or a flow velocity of an electrically conducting liquid, slurry or paste burdened with gas and for ascertaining therefor appropriately representative, primary measured values $X_M$. Especially, the measuring device is, however, additionally, also provided for determining, at least at times, a flow-type of the medium located in the measuring tube, as determined by an instantaneous flow profile and/or an instantaneous composition of the flowing medium and for representing such as a suitable state value $X_S$ serving as secondary measured value. The measuring device can, moreover, be connected to a fieldbus (not shown), so as to be in communication with a remote, control room and with an external energy, or power, supply. For the transmitting of measurement device data, especially also the primary measured value, to the fieldbus, a corresponding communication unit 5 with appropriate data interfaces 51 can be additionally provided. Further, the communication unit 5 can also, especially for enabling visualizing of measuring device data and/or a tuning of the flow measuring device on-site, have a corresponding display- and service-unit 52.

The measuring device includes, additionally, a flow transducer 1 for producing a measurement potential corresponding with the physical variable to be measured, an operating circuit 2 for registering the measurement potentials and for producing at least one measurement signal corresponding with the physical variable, and an evaluating circuit 3 serving for activating the operating circuit 2 and, thus, also the flow transducer 1, as well as for producing, with application of the at least one measurement signal, the primary measured values quantitatively representing the physical variable, especially the instantaneous volume flow, e.g. flow rate, and/or the instantaneous flow velocity. The operating circuit 2, and, on occasion, also some components of the flow transducer 1, can, as also indicated schematically in FIG. 1a, be accommodated in an electronics housing 10 of the flow meter.

Belonging to the flow transducer 1 is a measuring tube 11 insertable into the course of the mentioned pipeline. Measuring tube 11 has a tube wall. During operation, the medium to be measured is allowed to flow through the measuring tube 11 in the direction of a measuring tube longitudinal axis. Flow transducer 1 further includes a magnetic field system arranged at the measuring tube, especially a magnetic field system directly secured thereto, for producing a magnetic field of time-varying intensity especially a clocked magnetic field, passing at least sectionally through the medium in the measuring tube. As a result of this magnetic field, a corresponding measurement voltage is induced, at least at times, especially repeatedly by clocking, in the flowing medium.

For avoiding a short-circuiting of voltages induced in the fluid, an inner part of the measuring tube 11 contacting the fluid is electrically non-conductive. Metal measuring tubes are, for such purpose, usually provided internally with an electrically non-conductive layer e.g. of ceramic, hard rubber, polyurethane, polyfluoroethylene, etc., and are, in general, also non-ferromagnetic; in the case of measuring tubes made completely of plastic or ceramic, for example aluminum oxide ceramic, the electrically non-conductive layer is, in contrast, not necessary.

Figure 1B:
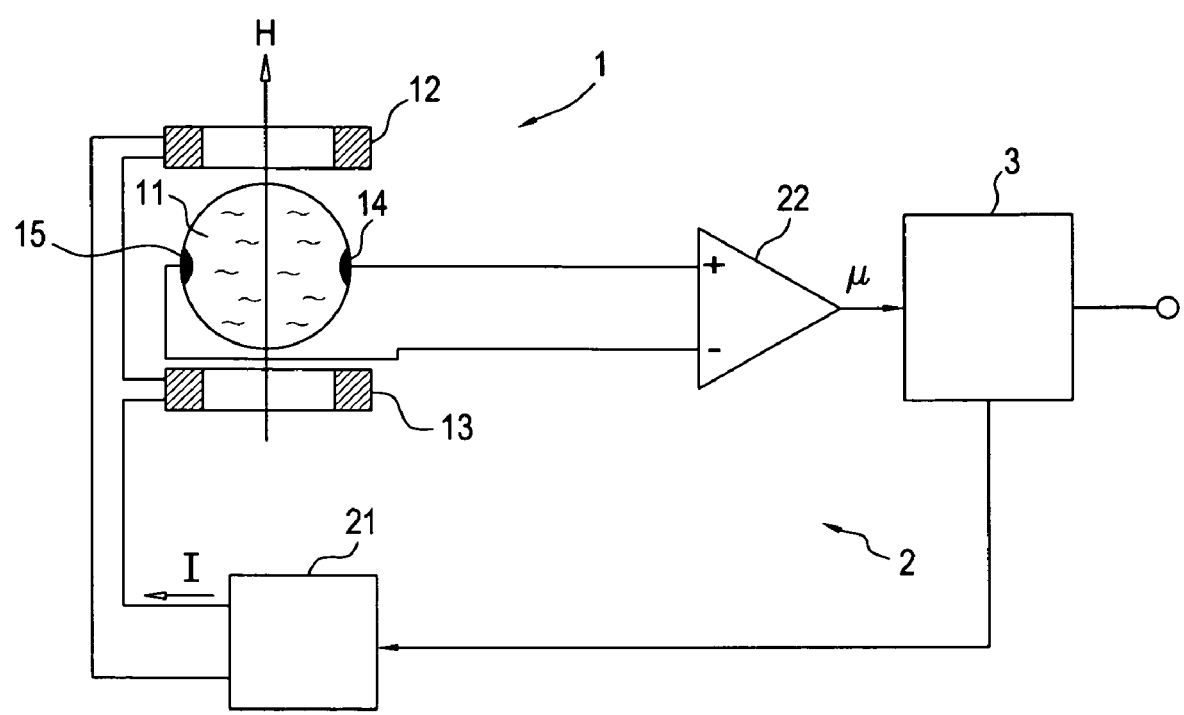

An exciter arrangement of the flow meter, activated by a driver electronics 21 provided in the operating circuit 2, includes, in the illustrated example of an embodiment, a first field coil 12 arranged at the measuring tube 11 and a second field coil 13 also arranged at the measuring tube 11. The field coils 12, 13 lie on a first diameter of the measuring tube 11. The exciter arrangement serves during operation for producing a magnetic field H passing through the tube wall and the fluid flowing therethrough. This occurs, when an exciter current I driven by the driver electronics 21 is allowed to flow in the field coils 12, 13, which are, here, connected in series. The exciter current I, especially a bi-polar exciter current I, can, in such case, have e.g. a rectangular, triangular or sinusoidal form. FIG. 1b shows that the field coils 12, 13 contain no core and thus are so-called air coils. The field coils 12, 13 can, however, also be wound around a core, as is usual in the case of such coil arrangements. The core is, in general, of a soft magnetic material. The cores can interact with pole shoes; compare e.g. U.S. Pat. No. 5,540,103.

The exciter arrangement formed in the illustrated example of an embodiment as a coil arrangement acting electromagnetically on the medium is, here, so embodied, especially the two field coils 12, 13 are so formed and sized, that the magnetic field H produced therewith is formed symmetrically, especially rotation-symmetrically, within the measuring tube 11, at least with reference to a second diameter perpendicular to the first diameter.

Figure 2A:
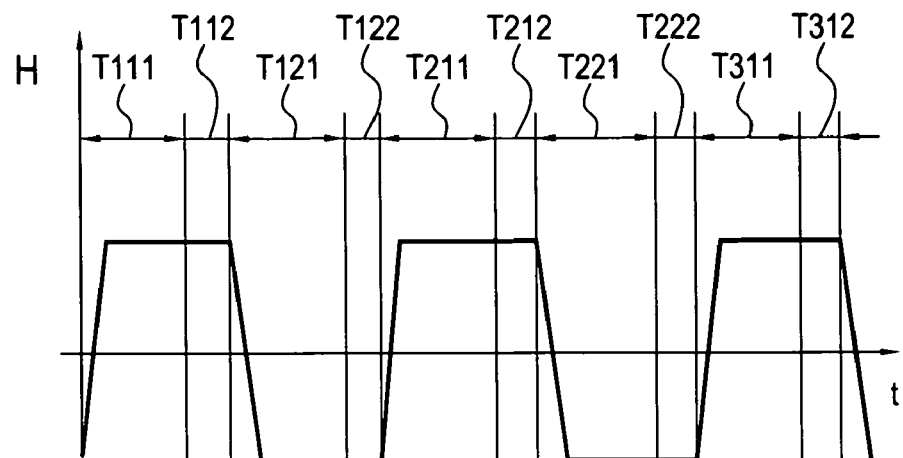
FIG. 2a shows schematically, a waveform for the exciter current flowing during operation of the process measuring device of FIGS. 1a, 1b.

In an embodiment of the invention, the driver electronics 21 produces a direct current, especially a direct current controlled to constant amplitude. This direct current is then reversed by means of an appropriate switching circuit, for example one configured as an H- or T-circuit, periodically, for example with a clock frequency in the range between 10 Hz and 50 Hz, and, thus, is modulated to form an alternating current of controlled amplitude. As a result of this, thus, the exciter current I is allowed to so flow through the coil arrangement that, as shown schematically in FIG. 2a, the exciter current flows through the coils 12, 13 during a first switch phase PH11 in a first electrical current direction, and, during a second switch phase PH12 following on the first switch phase, in a counter-direction opposite to the first electrical current direction; compare, for current control and reversal e.g. also U.S. Pat. No. 4,410,926 or U.S. Pat. No. 6,031,740. Following on the second switch phase PH12 is a third switch phase PH21, during which the exciter current I again flows in the first electrical current direction. Following on the third switch phase is a fourth switch phase PH22, during which the exciter current I again flows in the counter-direction. Thereupon follows a corresponding switch phase PH31, etc. Regarding the reversal of the direction of the exciter current I, in each case, two of the switch phases following, one after the other, form a period P1, P2, P3, etc. Accompanying the polarity reversal of the exciter current I flowing through the coil arrangement, apart from a possible phase shift, also the magnetic field H repeatedly reverses, essentially synchronously thereto; compare, in this connection, FIG. 2a.

For producing at least one electrical, measurement signal corresponding with the measured variable, there is additionally provided in the measuring transducer, arranged on the measuring tube or at least in its vicinity, a sensor arrangement, which taps the measurement voltage induced, at least at times, in the medium. Considering that the measuring device is, as already mentioned, intended especially also for flowing media which can be variable as regards their flow profile and/or their composition, and, especially, can be also of two or more phases, it is assumed that the measurement signal has both a wanted portion corresponding essentially with an instantaneous flow velocity of the medium as well as also a noise portion influenced, at least in part, by existent, or present-time, disturbances in the flowing medium, especially disturbances which are flow-type related.

In an embodiment of the invention, the sensor arrangement has electrodes applied, as a matter of practice, directly on the measuring tube. A first electrode 14 arranged on an inner side of the tube wall of the measuring tube 11 serves, in such case, for the tapping of a first potential $e_{14}$ induced by the magnetic field H. A second electrode 15 arranged in the same manner serves, further, for the tapping of a second potential $e_{15}$ induced by the magnetic field. The measuring electrodes 14, 15 lie on the second diameter of the measuring tube, perpendicular to the first diameter and to the measuring tube longitudinal axis; they can, however lie e.g. on chords of the measuring tube 11 parallel to the second diameter; see, in this connection, also U.S. Pat. No. 5,646,353. In the example of an embodiment shown here, the measuring electrodes 14, 15 are shown as galvanic measuring electrodes, thus electrodes that contact the fluid. However, also two capacitive measuring electrodes, thus e.g. measuring electrodes arranged within the tube wall of the measuring tube 11, can be used. Each of the measuring electrodes 14, 15 taps an electrical potential $e_{14}$, $e_{15}$, which is induced in the fluid flowing therethrough during operation on the basis of the Faraday Law.

As shown schematically in FIG. 1b, the measuring electrodes 14, 15 are connected during operation, at least at times, with, respectively, the non-inverting and inverting inputs of a difference amplifier 22. In this way, a potential difference of the two potentials $e_{14}$, $e_{15}$ tapped from the measuring electrodes 14, 15 is formed to serve as measurement signal u corresponding with a measurement voltage established in the fluid flowing therethrough and thus also with the physical variable to be measured. The potentials $e_{14}$, $e_{15}$ lying on the measuring electrodes 14, 15 are usually about in the range of 10 mV up to 100 mV.

For ascertaining the at least one measured variable to be measured, as well as also the flow-type of the medium instantaneously located in the measuring tube, the measurement voltage induced in the medium is tapped, at least at times, especially in a clocked manner, by means of an electrode pair formed by first and second measuring electrodes, and converted into an analog measurement signal corresponding appropriately with the measurement voltage.

The measurement signal u lying on the output of the difference amplifier 22 in the illustrated example of an embodiment is fed, as evident in FIGS. 1a, 1b, to the evaluating circuit 3 provided in the flow measuring device. It is to be noted here, however, that, in place of a single difference amplifier serving for producing an analog difference signal from the voltages on the measuring electrodes 14, 15, of course, separate signal amplifiers can be provided for each of the electrodes. Accordingly, for example, the potential difference of the two potentials $e_{14}$, $e_{15}$ tapped from the measuring electrodes 14, 15 can also be calculated numerically on the basis of two, separately digitized, measurement signals.

According to the invention, the evaluating circuit 3 serves, especially, for digitizing the incoming measurement signal u and sectionally storing such in the form of a first data set $DS_1$, so that, for ascertaining the measured value $X_M$, information is held available in digital form concerning the behavior with respect to time of a section of the measurement signal. For this purpose, the measurement signal u is fed to the evaluating circuit 3, as shown schematically in FIG. 1a, in the shown example of an embodiment, via a lowpass filter 31 of predeterminable filter order, e.g. a passive, or an active, RC-filter, and of adjustable limit frequency. Lowpass filter 31 serves for band-limiting the measurement signal u for preventing aliasing error and thus for appropriately preprocessing the measurement signal u for digitizing. The limit frequency is set, according to the known Nyquist sampling theorem therefor, to less than 0.5-times a sampling frequency, with which the passed fraction of the measurement signal u is sampled. For the case in which the measurement signal u is already band-limited in the required manner, the lowpass filter 31 can, on occasion, be omitted. On the output side, the lowpass filter 31 is coupled to a signal input of an A/D (analog-to-digital) converter 32 of the evaluating circuit 3, serving for converting the measurement signal u fed via lowpass filter 31 into a digital measurement signal $u_D$ representing such. The A/D converter 32 can be an A/D converter, e.g. a serial or parallel-converting A/D converter, known to those skilled in the art, capable of being clocked at the above-mentioned sampling frequency. An A/D converter type suitable therefor is e.g. that of a delta-sigma A/D converter ADS1252 of Texas Instruments Inc. with a 24-bit resolution and an allowable sampling frequency of less than, or equal to, 40 kHz, wherein sampling frequencies of less than 10 kHz can be quite sufficient for implementing the method of the invention. For the case, in which the applied A/D converter 32, such as e.g. the aforementioned ADS1252, is designed for converting exclusively positive signal values, a reference voltage of the A/D converter 32 is correspondingly so introduced, that an expected minimum signal value on the input of the converter sets at least one bit, especially the highest significant bit (MSB), of the measurement signal $u_D$. In other words, to the signal lying on the output of the lowpass filter 31 is to be added a direct voltage such that the signal acts on the A/D converter 32, for practical purposes, as a direct voltage signal of variable amplitude. Additionally, it can also be of advantage to then filter the digital measurement signal $u_D$, for example by means of digital FIR- and/or IIR-filters.

The digital measurement signal $u_D$ on the output side of the A/D converter 32, possibly filtered again, this time digitally, is loaded segment-wise, e.g. via an internal data bus, into a volatile data memory 33 of the evaluating circuit 3 and held there available, especially for a digital flow computer 34, as a finite sampling sequence SS instantaneously representing the measurement signal u in the form of an ensemble of digitally stored, measurement data. Serving as data memory 33 can be, in such case, e.g. static and/or dynamic, write-read memories.

A width for an instantaneous sampling window, thus a length in time of the section of the sampling sequence SS to be stored for instantaneously representing the measurement signal u, can lie, for example, in the range of the total duration of one of the periods P1, P2, with which the exciter current I is clocked or also in the range of the duration of one of the switch phases PH11, PH12, PH21, PH22, wherein the rhythm with which data is read into the data memory 33 has, accordingly, also, essentially an equal phase to that of the clocking of the exciter current. Usual clock times lie, in the case of conventional flow meters of the described kind, about in the range of 10 to 100 ms, which, in turn, means, in the case of a sampling frequency $f_s$ of A/D-converter 32 of 10 kHz, in each case, 100 to 1000 samples, thus 1000 stored sampled values of the sampling sequence SS, or the first data set.

In case necessary, for example as a result of a lesser memory capacity of the data memory 33 or for front-end elimination of field-reversal-related, voltage transients, it is also possible to read into the data memory 33 only a portion of the measurement signal u, or, better said, the digital measurement signal $u_D$, produced per switch phase. For purposes of illustration in this connection, the above-mentioned switch phases PH11, PH12, PH21, PH22, PH31 are, in each case, divided into associated, first subperiod durations T111, T121, T211, T221, T311 and associated, second subperiod durations T112, T122, T212, T222, T312 serving as measurement phase; compare FIGS. 2a, 2b and 2c. Preferably, in the case of this embodiment of the invention, in each case, virtual imaging in the data memory 33 occurs always only in the part of the measurement signal u belonging to the, in each case, existent, second subperiod durations T112, T122, T212, T222 or T312, while the evaluating of the measurement data and production of the measured value can then take place, in each case, during the next magnetic field build-up phase T121, T211, T221, T311.

For producing the measured value $X_M$ from the sample sequence SS, the flow computer 34 has, e.g. via an internal data bus, at least temporarily, an access, especially a data-reading access, to the data memory 33 and the data sets stored therein. The flow computer 34 can be implemented e.g., as shown schematically in FIG. 1a, in advantageous manner by means of a microprocessor 30 and calculative programs running therein. Alternatively to, or in supplementation of, the microprocessor, however, also a digital signal processor can serve for implementing the flow computer.

In an embodiment of the invention, the evaluating circuit 3 includes, additionally, a memory manager 35, which, in communication with the microprocessor 30, e.g. via an internal data bus, serves for managing the data memory 33, especially for controlling the sampling of the digital measurement signal $u_D$ and the production of the sample sequence SS, and, in this way, to unload the microprocessor 30. The memory manager 35 can be implemented e.g. in a programmable function memory, e.g. a PAL (programmable array logic) or an FPGA (field programmable gate array). In case necessary, the memory manager 35 can also be implemented by means of the microprocessor 30 or a further microprocessor (not shown) and corresponding computer programs running therein. For further unloading of the microprocessor, the memory manager 35 can also be responsible e.g. for forming, over a plurality of sampling sequences, the average value or median, as usual for such flow measuring devices.

Figure 2B:
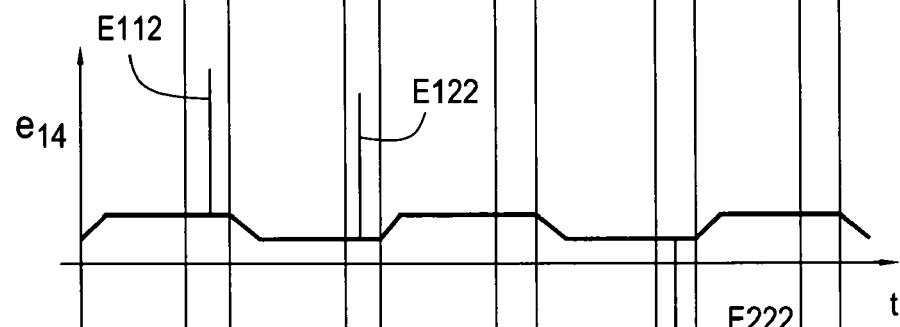
FIGS. 2b and 2c.
Figure 2C:
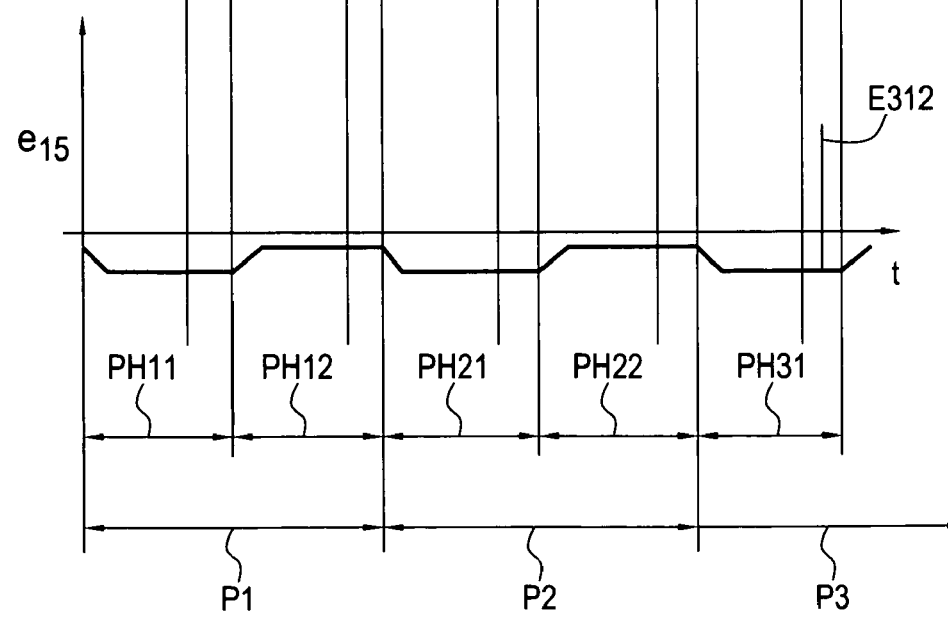
Figure 3A:
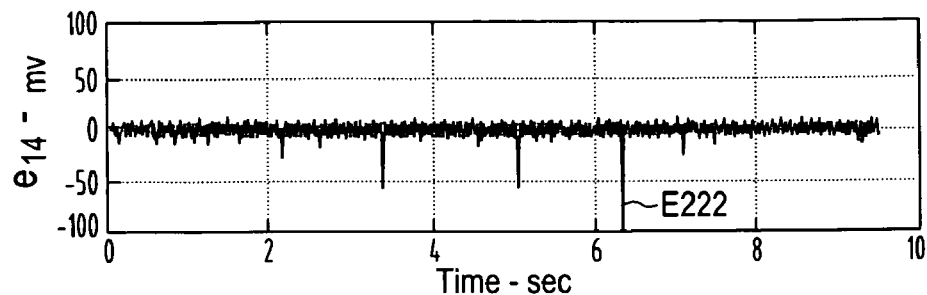
FIGS. 3a and 3b.
Figure 3B:
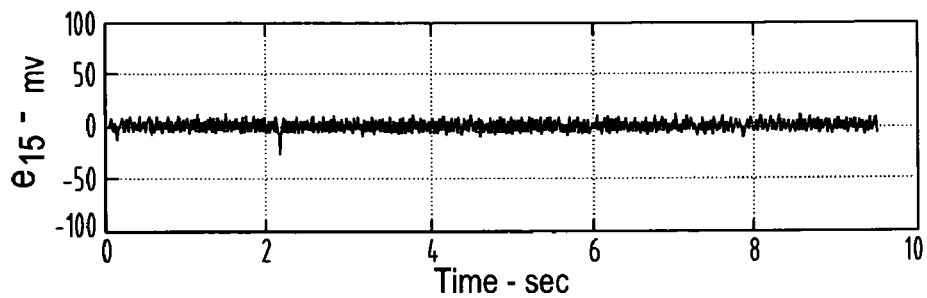
Figure 4A:
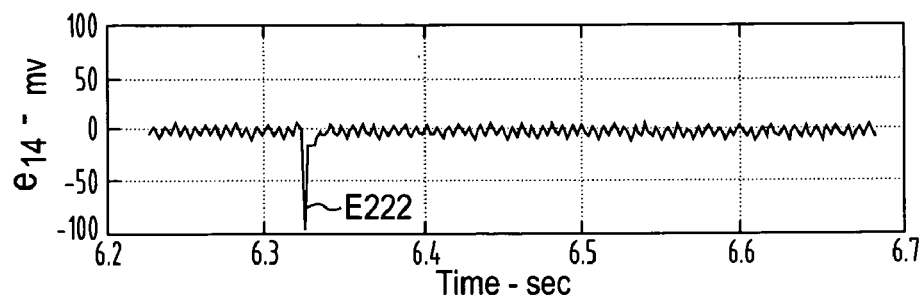
FIGS. 4a and 4b.
Figure 4B:
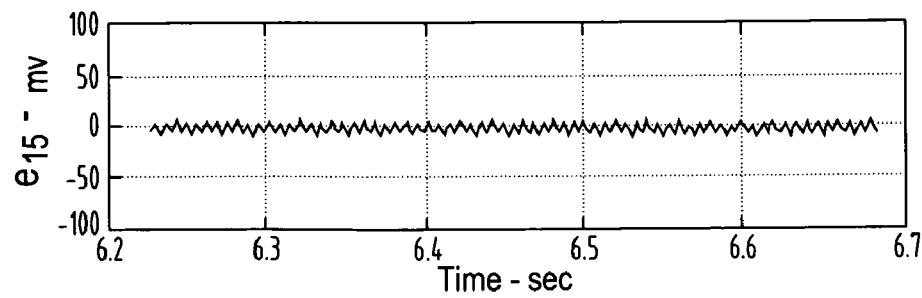
Figure 5A:
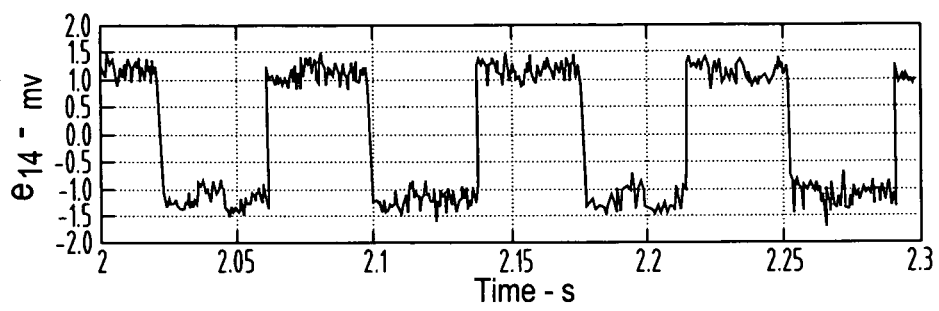
Figure 5B:
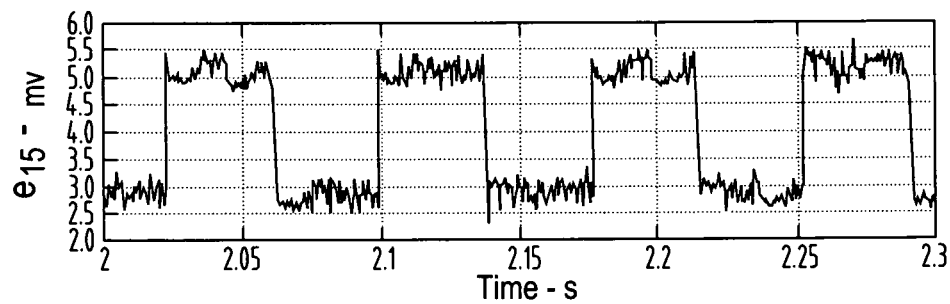
Figure 6A:
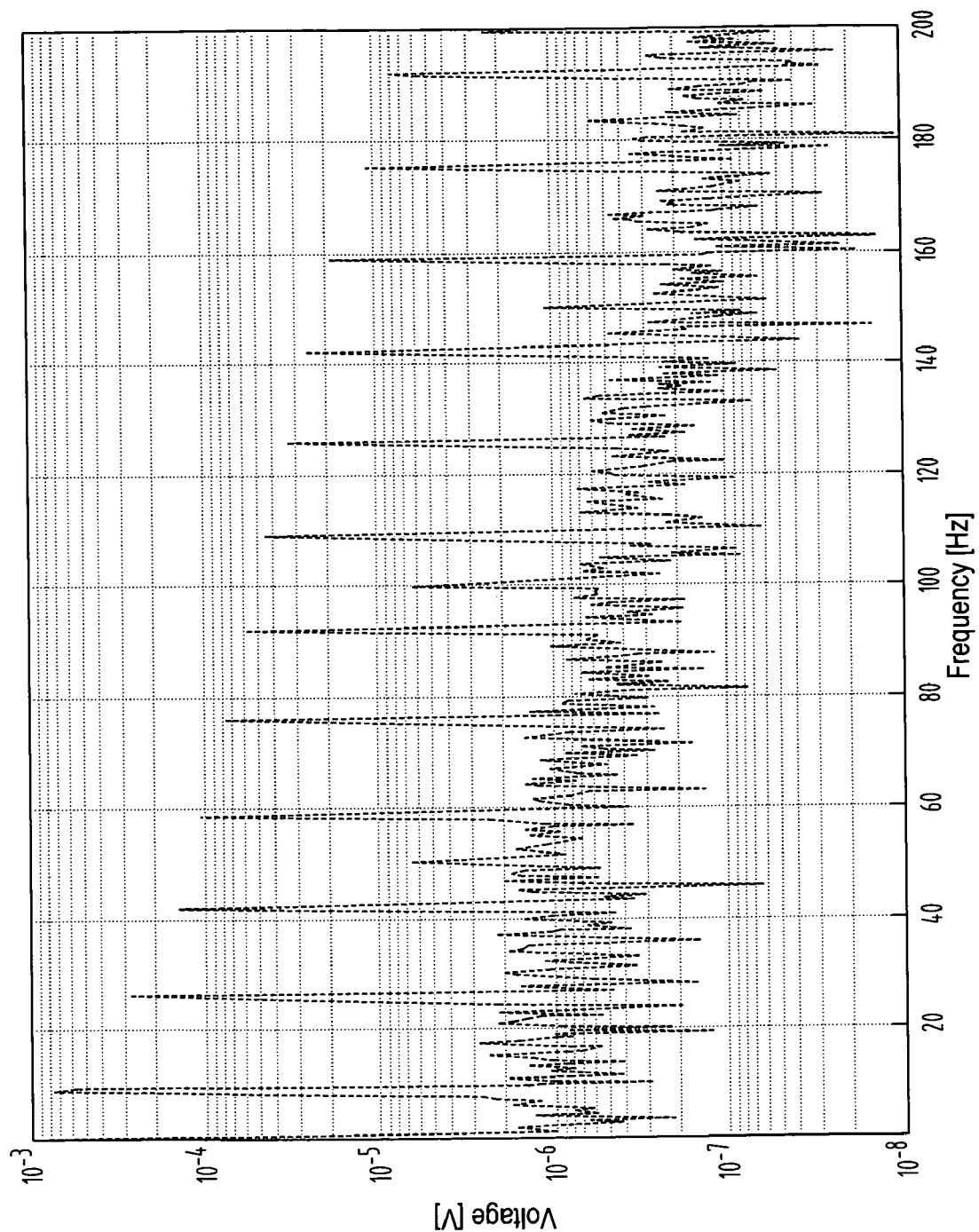
FIG. 6a shows a wanted/noise spectrum obtained on the basis of a measurement signal produced by means of a measuring device of FIGS. 1a, 1b.

As already mentioned above, the measurement signal u can be disturbed to a considerable degree and, thus, corrupted, by disturbance potentials E112, E122, E222, E312 arising on the measuring electrodes 14, 15; see, in this connection, also FIGS. 2b, 2c. For purposes of illustration, additionally shown in FIGS. 3a, 3b are plots of the potentials $e_{14}$, $e_{15}$ recorded over about 10 seconds, during which disturbance disturbance potentials are superimposed, with, in the described manner, disturbed regions of the recorded plots of the potentials $e_{14}$, $e_{15}$ being shown again in FIGS. 4a, 4b at a different scale; in comparison therewith, practically undisturbed regions of the plots of the potentials $e_{14}$, $e_{15}$ shown in FIG. 3a, respectively 3b, are presented again in FIGS. 5a, 5b, while, in FIG. 6a, a spectrum is shown, recorded on the basis of such a measurement signal.

Figure 6B:
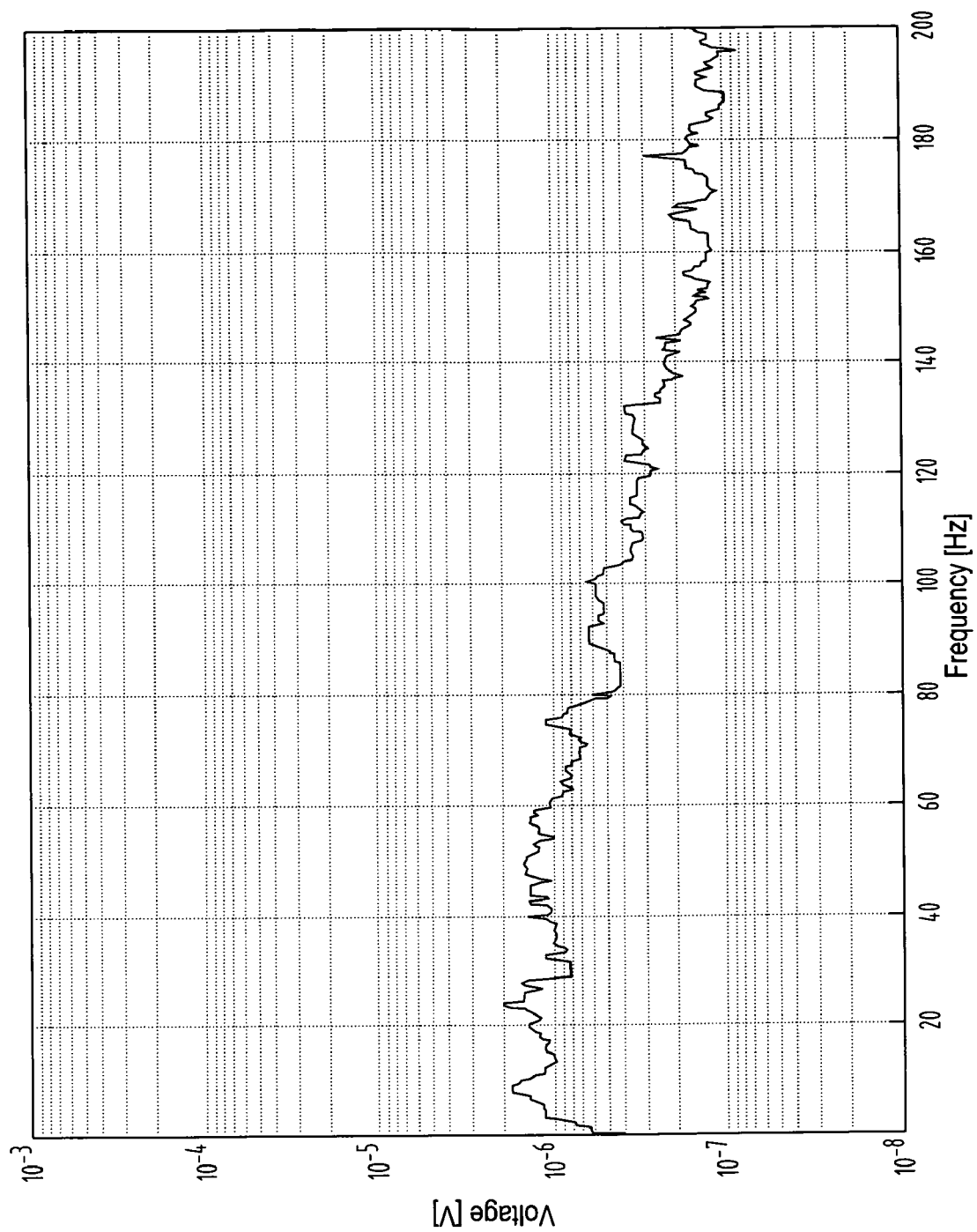
Figure 7A:
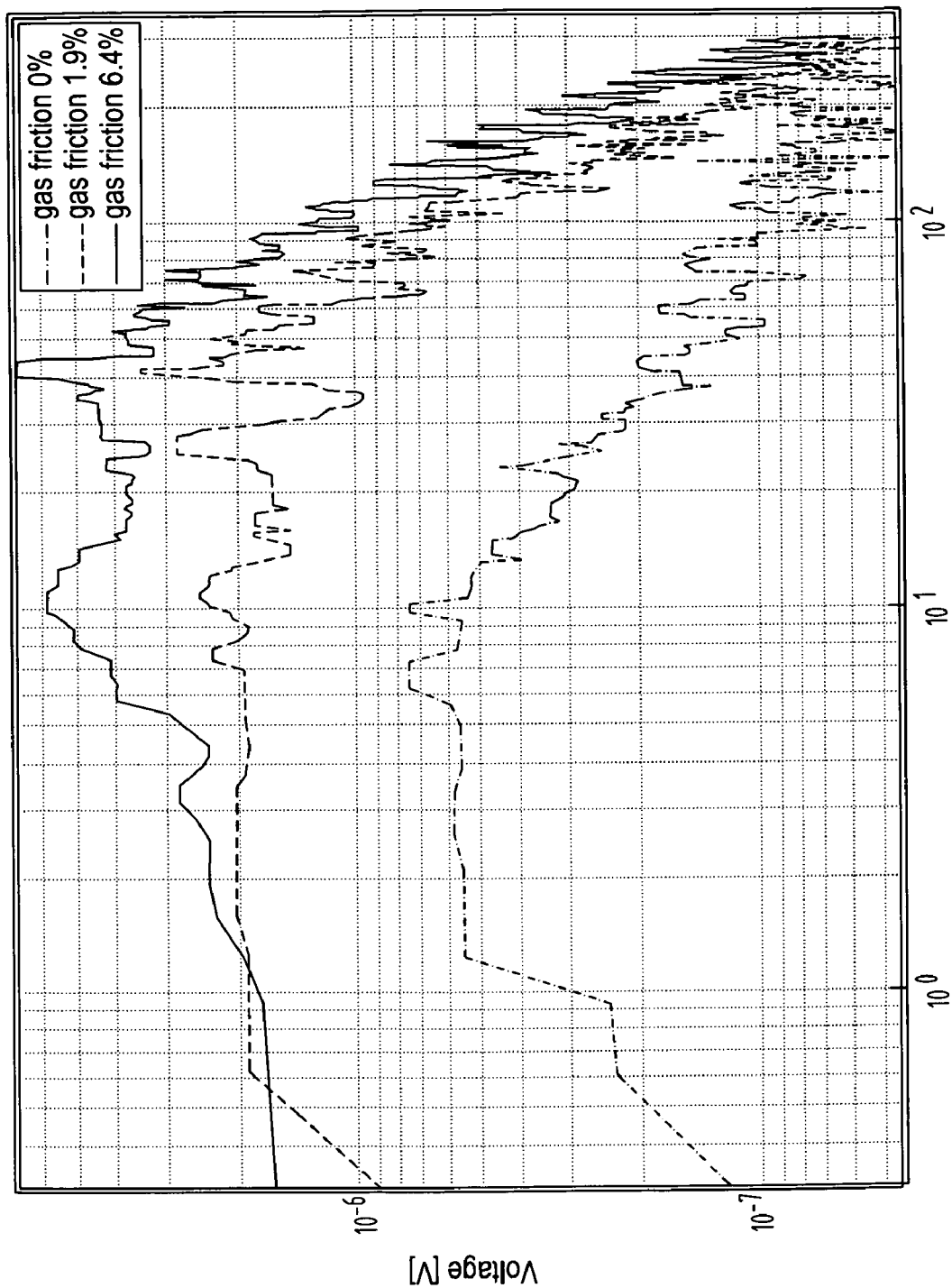
FIGS. 7a and 7b show different, comparative noise spectra obtained on the basis of measurement signals for various flow-types produced by means of a measuring device of FIGS. 1a, 1b.
Figure 7B:
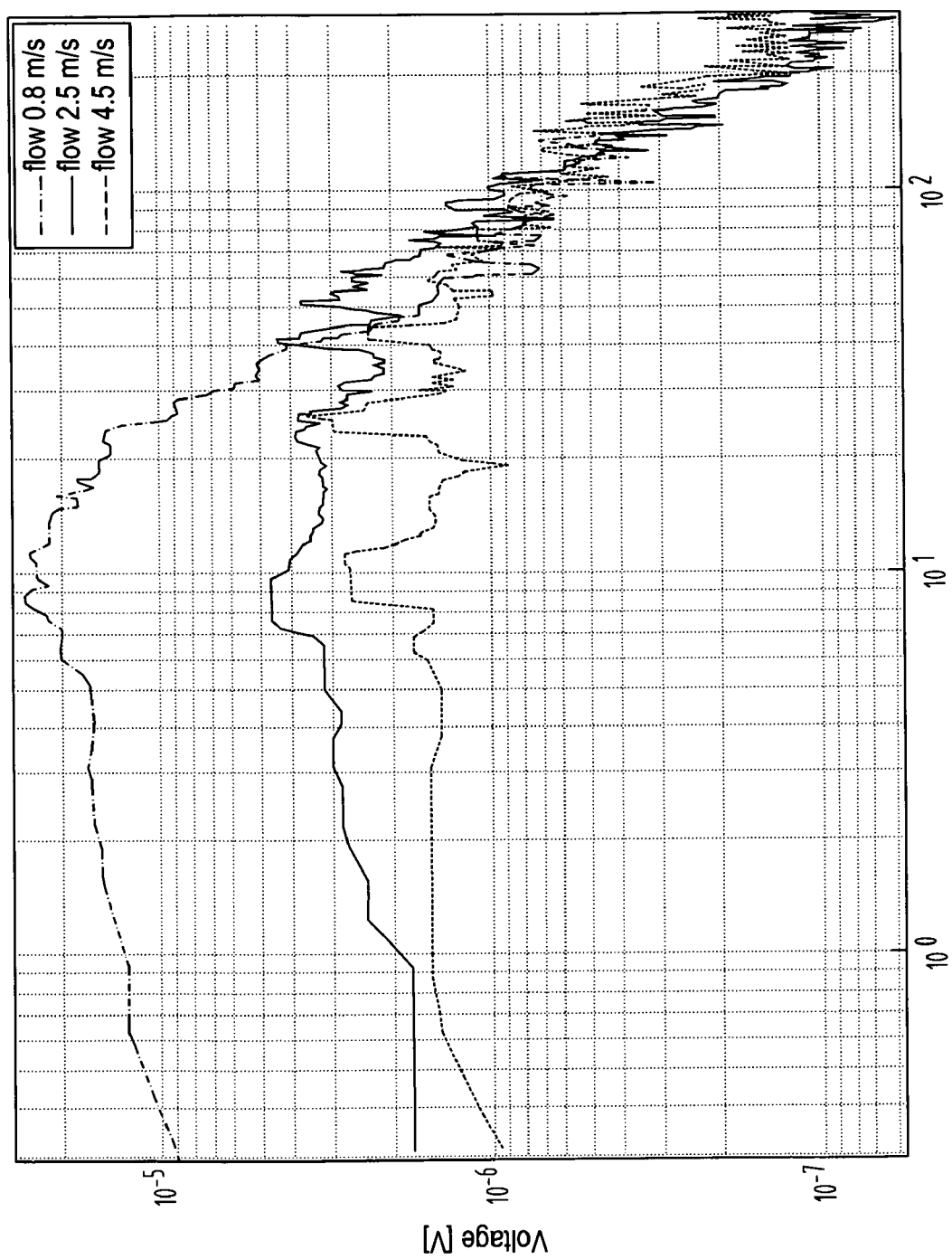

Investigations performed on such measurement signals obtained by means of magneto-inductive flow transducers have shown for a number of cases of application that the flow-type of the medium located in the measuring tube can be ascertained based on the noise portion of the measurement signal sufficiently accurately at least for purposes of alarm generation. Further investigations have shown, additionally, that for a large number of flow-type-related, disturbance potentials, the wanted and noise portions of the measurement signals can, surprisingly easily, be separated from one another in the discrete spectral region, starting with the wanted/noise spectrum, at least to the extent that, as shown by way of example in FIG. 6b, a noise spectrum largely isolated from the wanted portion can be directly derived from the wanted/noise spectrum. The frequency range having meaning for the flow-type ascertainment lies, in such case, about between 0 up to 500 Hz. This means, for example, that the ascertainment of flow-type can also be performed based on the extracted noise-portion, present in digital form, independently of the ascertaining of the measured value. Furthermore, it could be ascertained that a signal power of the noise portion, shown in the frequency domain, for example, by its spectral amplitude density or also its spectral power density, has, on the flow-type instantaneously reining in the measuring tube, significant dependencies, which quite enable, during operation, based on an instantaneous spectral power density, identification of an instantaneous flow-type, e.g. by comparison with different, earlier ascertained, noise powers of distinctive flow-types. For example, in the comparison of noise spectra, recorded, in each case, with equal media at constant flow with different gas fractions (compare, for this, also FIG. 7a), or at variable flow and constant gas quantity (compare, for this, also FIG. 7b), it can be determined that, on the one hand, the noise spectrum displays a marked limit frequency, above which the spectral noise power clearly lessens at higher frequencies and, as a result of which, at least on average, a predeterminable threshold value is no longer exceeded, and, on the other hand, the spectral noise power below the aforementioned limit frequency does, it is true, become ever smaller per frequency portion with increasing flow rate, yet the limit frequency itself is shifted to higher frequencies. As a result, thus, the noise spectrum has, lying below an existent limit frequency usable as reference frequency, especially a changeable limit frequency and/or one influenced by the flow-type of the medium, a lower frequency band portion, within which the noise portion currently exceeds, at least on average, a predetermined minimum level, as well as, lying above the limit frequency, an upper frequency band portion, within which the noise portion currently falls below, at least on average, the predetermined minimum level.

In view of this, one can proceed therefrom, that, on the basis of a spectral amplitude curve, especially also on the basis of a spectral power density, especially of the noise portion, the flow-type instantaneously present in the measuring tube is detectable to the extent that, therewith, at least the presence of flow-type-related disturbances, on occasion, even their degree, can be estimated. The estimation of the flow-type based on the noise spectrum can, in such case, take place even more accurately, the more accurately the medium instantaneously actually present in the measuring tube is specified. At least for the case that the medium can, per se, be assumed as known, also a correction of the disturbances of the measurement signal, or of the measured value derived therefrom, is, consequently, also directly possible.

Based on the aforementioned discoveries, for ascertaining the at least one flow-type, it is therefore provided to ascertain, with application of the digital signal, a noise spectrum, especially a band-limited noise spectrum, corresponding at least predominantly with the noise portion of the measurement signal. Furthermore, it is provided, in the case of the measuring device of the invention, to ascertain, with application, at least, of a part of the noise spectrum, a state value which signals, at least qualitatively, especially as currently as possible, the flow-type instantaneously present in the measuring tube.

Accordingly, in an embodiment of the invention, it is further provided that, at least for the purpose of ascertaining the state value based on the noise spectrum, the wanted and noise portions of the measurement signal are appropriately separated from one another. In a further embodiment of the invention, for such purpose, with application of the digital signal, first a discrete wanted/noise spectrum of the measurement signal, corresponding both with the noise as well as with the wanted portion of the measurement signal, is ascertained, at least for the frequency range of interest (FIG. 6a), by, for example, subjecting at least a section of the digital signal of the sampling sequence SS derived therefrom to a discrete Fourier transformation. Based on the wanted/noise spectrum, the noise spectrum of the measurement signal can, for example, be ascertained by ascertaining, on the basis of the digital signal and/or the sampling sequence SS derived therefrom, a wanted spectrum of the measurement signal corresponding at least predominantly with the wanted portion of the measurement signal, this being done especially also taking into consideration whole-numbered multiples of the clock frequency of the magnetic field control, or the measured value production coupled thereto, in the wanted/noise spectrum. This wanted spectrum of the measurement signal corresponding predominantly with the wanted portion is appropriately removed from the wanted/noise spectrum. This corresponds in the example shown in FIG. 6 essentially to the exponentiated amplitude peaks located, in each case, at the clock frequency as well as at the whole-numbered multiples thereof. The removal of the wanted spectrum from the wanted/noise spectrum can take place in simple manner e.g. by subjecting the wanted/noise spectrum to a median filtering.

In the application of sampling frequencies essentially higher as compared to the frequency range of interest for the flow-type determination (quite usual, here, are sampling frequencies from 10 to, on occasion, more than 100-times higher), a downsampling of the digitized measurement signal $u_D$ can be of advantage for lessening the data rate. A downsampler suitable therefor for the digital signal $u_D$ can comprise, for example, an FIR-filter of higher order (>30) of Tschebyscheff configured as a half-band filter, especially one also further band-limiting the noise spectrum, with subsequent reduction by a factor of 2, wherein the downsampler can also be applied to the reduced digital signal. Accordingly, then, also a correspondingly reduced sampling sequence would be stored in the memory and Fourier transformed.

Figure 8A:
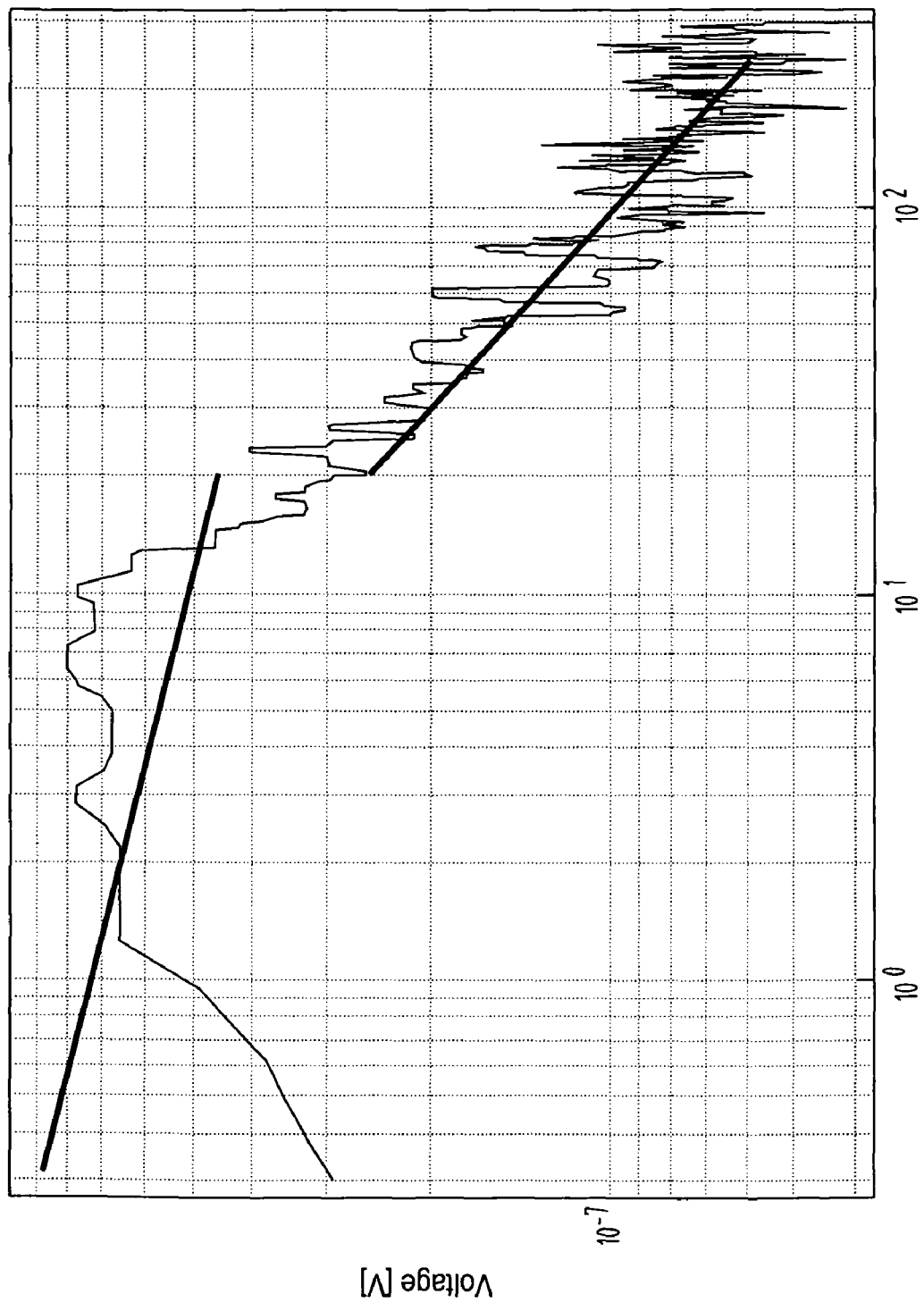
FIGS. 8a, 8b and 8c show schematically, fitted curves placed in noise spectra obtained on the basis of measurement signals for different flow-types, as produced by means of a measuring device of FIGS. 1a, 1b.
Figure 8B:
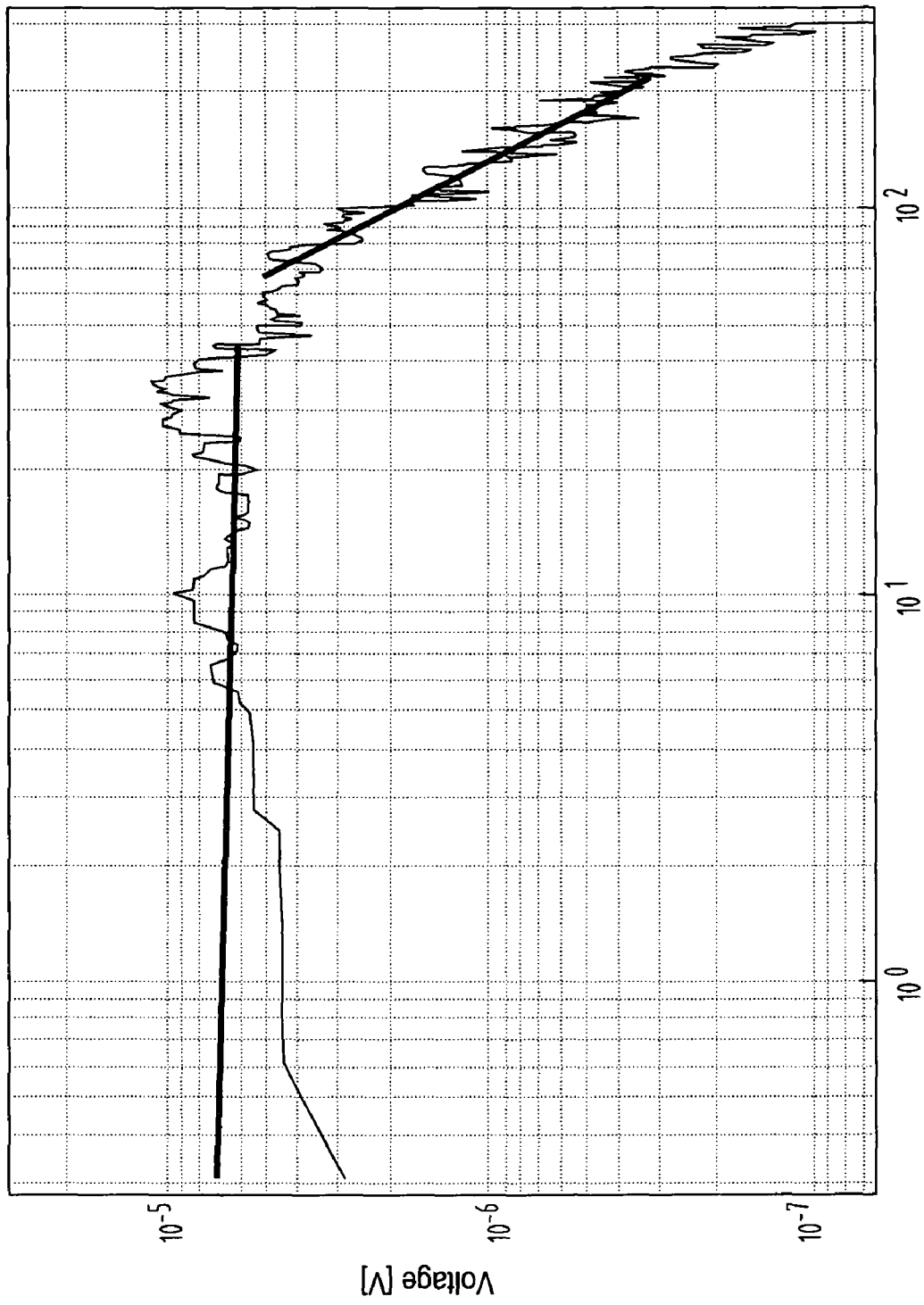
Figure 8C:
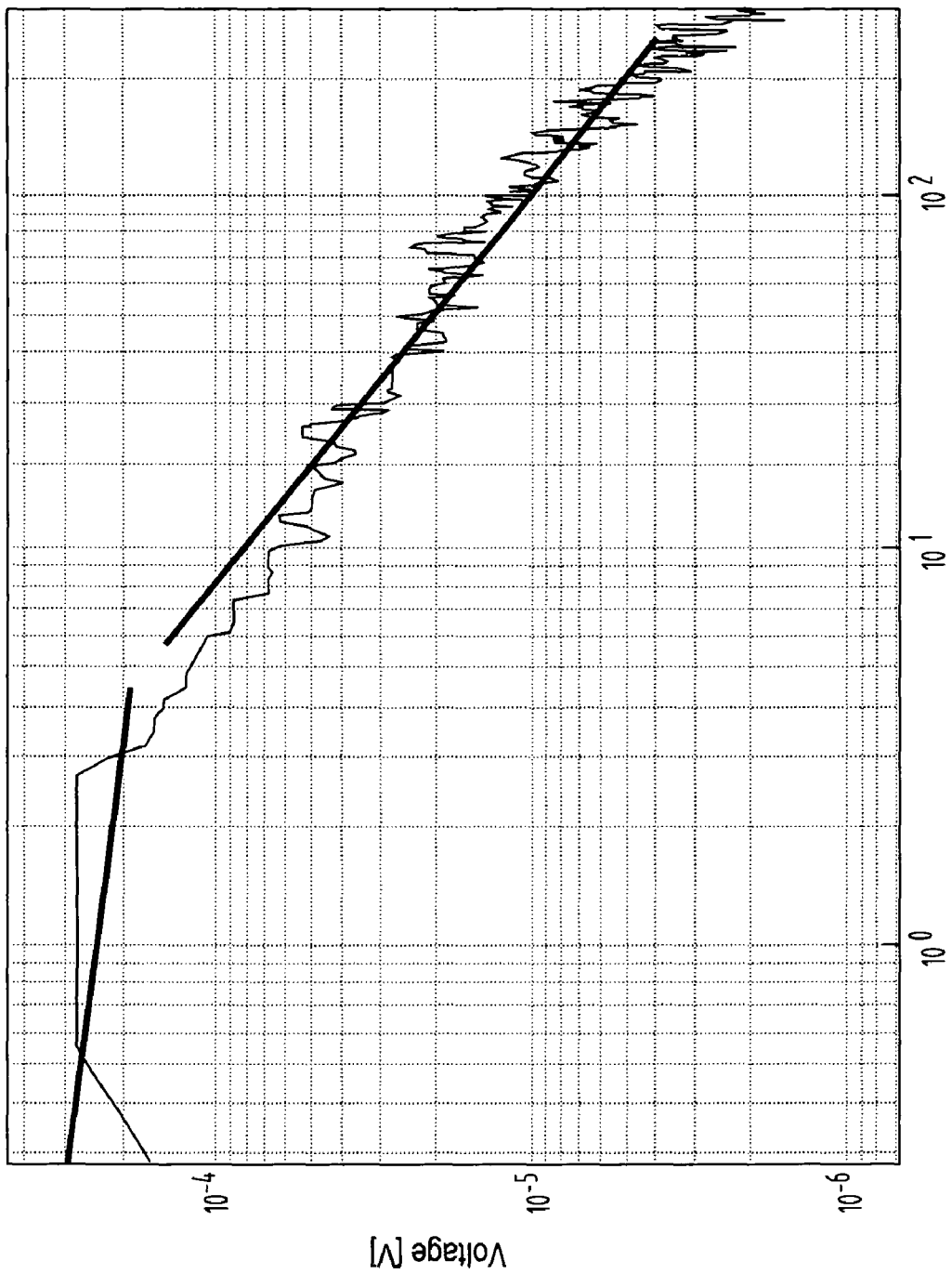

On the basis of the noise spectrum, especially a noise spectrum separately available, an automatic detection, in the sense of a recognition, of the presence of a predetermined flow-type and/or also in the sense of the quantifying of the degree of disturbance, especially also its influence on the accuracy of the measurement, can then take place. For instance, noise spectra (FIG. 7a, 7b) recorded using stereo-typical disturbances, in such respect also representative of flow-type, can, in each case, be fitted to corresponding mathematical signal models. The signal models can, in advantageous manner, be so selected that they differ from one another, depending, in each case, on the represented flow-(stereo)-type, only in the concrete expression of their particular model-parameters, while being, for example, of equal structure as regards their order. Such signal models suited for online registering of flow types can be e.g. simple fitted curves for the totally used noise spectrum and/or fitted curves approximating only individual, selected sections of the noise spectrum. For the noise spectra shown by way of example in FIGS. 7a, 7b, at least when using such frequency and amplitude values presented logarithmically based on powers of ten, a suitable, very simple signal model can be composed of two equations of lines, for two fitted lines obtained by corresponding fitting calculations, for example the method of least squares. This is shown, by way of example, in FIG. 8a for a flow-type "water without gas fraction", in FIG. 8b for a flow-type "water with gas charge", and in FIG. 8c for a flow type "pulp with gas charge", in double-logarithmic plots, where the lines are shown respectively below and above the mentioned limit frequency.

Accordingly, in a further embodiment of the invention, it is provided that at least one existent reference frequency is ascertained for the noise spectrum, for ascertaining the at least one state value. The reference frequency can be, for example, the mentioned limit frequency, above which the noise spectrum no longer exceeds, at least on average, a predetermined threshold value for the spectral amplitude values. Another model-parameter suitable for determining the instantaneous state value can be, additionally, a gradient value for the noise spectrum representing a frequency-dependent change at least of a section of a spectral amplitude density of the noise portion, especially a section located above the limit frequency. For the noise spectra shown in FIGS. 7a, 7b, for example, a slope of a fitted curve above this limit frequency can be used as the gradient value; compare, in this connection, also FIG. 8a, 8b or 8c. Alternatively to or in supplementation of the reference frequency and/or gradient value, for example, also an average spectral power density of the lower and/or upper frequency band can serve as a model-parameter. Accordingly, for ascertaining the at least one state value, a further embodiment of the invention additionally provides that a spectral power density, at least of the noise portion of the measurement signal, is determined, especially with application of at least one part of the noise spectrum. Found to be well suited as a model-parameter for online detection of the existent flow-type is, in such case, a form factor referred to as noise number, which corresponds to a spectral signal power of the noise portion for its frequency portions lying below the limit frequency. Considering the fact that the instantaneous limit frequency of the noise spectrum, as already mentioned, depends to a certain degree also on the instantaneous flow, additionally, also the existent reference frequency for the existent flow measured value can serve as indicator for the instantaneous flow-type.

In a further embodiment of the invention, it is additionally provided, for ascertaining the at least one state value, to ascertain further, for the upper frequency portion lying above the reference frequency, a model-parameter representing the upper frequency band portion distinguishably from the lower frequency band portion. In a further development of the invention, in addition to the model-parameter representing the upper frequency band portion, also at least one model-parameter is ascertained for the lower frequency band portion lying below the lower reference frequency. In advantageous manner, the two model-parameters representing the two frequency bands can be embodied as of equal type, so that they can be compared directly with one another. Alternatively thereto or in supplementation thereof, for ascertaining the at least one state value, also a model-parameter can be used for the measurement signal, such as a model-parameter currently representing a signal characteristic of the noise portion within the total noise spectrum, for example a signal power of the total noise spectrum.

The occurrence of gas bubbles in aqueous liquids, as a quite frequently occurring flow-type, can, for example, be detected on the basis of the aforementioned model-parameters in simple manner by comparing the noise number instantaneously ascertained during operation for the measurement signal, as well as also the gradient value, with associated, significant reference values predetermined for this state. For the case in which the noise number is greater than a predetermined minimum noise number and the gradient value is smaller than a predetermined maximum gradient value, then it can be assumed that gas bubbles are present in the medium and, as a result, a state value correspondingly signaling such can be issued. This is especially true, when the limit frequency has the above-described dependence on flow, for example represented by a scarcely fluctuating, or fluctuating only slightly, ratio of the extant reference frequency to the extant flow measured value. Accordingly, in a further embodiment of the invention, it is additionally provided that the state value is ascertained on the basis of a comparison of at least one model-parameter for the noise spectrum with a total noise reference value correspondingly predetermined therefor, especially with application of the existent reference frequency and the model-parameter representing the upper frequency band portion, especially a model-parameter present in the form of a gradient value or an average of the spectral power density of the upper frequency band. Further, the state value is generated in a further development of the invention also taking into consideration the existent and/or an earlier ascertained, primary measured value. Instead of the case described here by way of example, of gas bubbles in water, this approach is also applicable for identifying other significant flow-types, on occasion also taking into consideration further model-parameters for signal models of higher order. Alternatively to or in supplementation of the aforementioned, parametric signal models, it is also possible, in case required, to use other classifiers on the pertinent noise spectrum, for example also neural networks, multivariate classifiers based on covariance analyses, or also fuzzy networks.

Depending on the interests of the user, the state value and, accordingly, also the method implemented for its ascertainment, can be so designed that it can only assume a few, discrete values describing, perhaps qualitatively, the flow-type. For example, the ascertaining of the state value can be embodied in such a manner that the state value signals whether the medium is currently to be considered as essentially single-phase and, as a result, homogeneous, or whether the medium instantaneously located in the measuring tube is more in the nature of a two, or more, phase substance. Depending on knowledge of the actual process, the state value can also signal whether the medium has essentially one and/or essentially two fluid phases. Accordingly, the state value can signal, for example, also that the medium has at least one gaseous phase and at least one liquid phase. In the presence of more accurate knowledge of actual process behavior, the state value can, if required, also be ascertained in a manner such that it represents, quantitatively, the measure of the disturbance, for example, thus the gas fraction in the liquid.

Moreover, with knowledge of the influence of the detected flow-type, the state value can additionally also be applied for appropriately compensating the influence of the flow-type instantaneously detected in the measuring tube on the measurement signal and, as a result, on the accuracy of the primary measured value and, thus, for ascertaining the primary measured value more accurately. This can be implemented e.g. by comparing the instantaneously ascertained state value with at least one predetermined state reference value representing a predetermined flow-type of the medium, especially a flow-type necessary for safe operation and/or a predetermined accuracy of measurement of the flow meter, and by issuing, based on a comparison, at least one alarm, which signals, especially visually and/or acoustically perceptibly, that the currently ascertained flow-type deviates from a predetermined flow-type. On occasion, along therewith, also the production or output of the primary measured value can, as such, be, at times, completely interrupted.

It is to be noted here, that both the evaluation method required for producing the primary measured value and also the evaluation method required for ascertaining the state value can be implemented by those skilled in the art in the form of a computer program running in a microprocessor 30. The program codes respectively required therefor can be installed directly in a writable, especially permanently writable, memory 36 of the evaluation stage 3, e.g. an EPROM, a flash-EEPROM or an EEPROM, which the microprocessor 30 accesses during operation for reading data. An advantage of the invention is, as a result, that both conventional flow transducers as well as also conventional operating circuits can essentially continue to be used after appropriate modification of the implemented software.

The invention claimed is:

1. A Method for operating a magneto-inductive flow meter, comprising steps of:
    allowing a medium to be measured to flow through a measuring tube of a flow meter;
    producing a magnetic field, passing at least sectionally through the medium in the measuring tube with intensity varying as a function of time, in such a manner that a measurement voltage is induced, in the medium;
    tapping, by means of an electrode pair formed by first and second measuring electrodes, the measurement voltage induced in the medium, for producing an analog measurement signal corresponding with the measurement voltage, wherein the measurement signal has a wanted portion corresponding with an instantaneous flow velocity of the medium as well as a noise portion influenced at least in part by extant disturbances in the flowing medium; and
    ascertaining a flow-type of the medium located in the measuring tube, as determined by at least one of: an instantaneous flow profile and an instantaneous composition of the flowing medium, wherein the step of ascertaining the flow-type includes the steps of:
    producing a digital signal representing the at least one measurement signal;
    ascertaining, with application of the digital signal, a noise spectrum of the measurement signal, a band-limited noise spectrum corresponding, at least predominantly, with the noise portion; and
    ascertaining, with application at least of a part of the noise spectrum, at least one state value signaling at least qualitatively, as near-in-time as possible, a flow-type present in the measuring tube,
        wherein, the step of ascertaining the at least one state value comprises a step of ascertaining a spectral power density at least of the noise portion of the measurement signal.

2. The method as claimed in claim 1, wherein:
the step of ascertaining the noise spectrum of the measurement signal further comprises a step of separating wanted and noise portions.

3. The method as claimed in the claim 2, wherein:
the separating of wanted and noise portions occurs, at least in part, with application of the digital signal.

4. The method as claimed in claim 1, wherein:
the step of ascertaining the noise spectrum of the measurement signal further comprises a step of ascertaining a wanted/noise spectrum of the measurement signal corresponding both with the noise- and with the wanted-portion of the measuring signal.

5. The method as claimed in claim 4, wherein:
the step of ascertaining the noise spectrum of the measurement signal further comprises a step of removing from the wanted/noise spectrum a wanted spectrum corresponding at least predominantly with the wanted portion.

6. The method as claimed claim 5, wherein:
for removing the wanted spectrum from the wanted/noise spectrum, the latter is subjected to a median filtering.

7. The method as claimed in claim 1, wherein:
the ascertaining of the spectral power density at least of the noise portion of the measurement signal takes place with application at least of a part of the noise spectrum.

8. The method as claimed in claim 1, wherein:
the step of ascertaining the at least one state value comprises a step of ascertaining at least one model-parameter for the measurement signal, and the model-parameter represents currently a signal characteristic of the noise portion within the total noise spectrum.

9. The method as claimed in claim 8, wherein:
the step of ascertaining the at least one state value further comprises a step of comparing the model-parameter with a model reference value predetermined therefor.

10. The method as claimed in claim 8, wherein:
the at least one model-parameter represents a spectral power density of the noise portion.

11. The method as claimed in claim 1, wherein:
the noise spectrum has a lower frequency band portion lying below the existent reference frequency, and/or a reference frequency influenced by the flow-type of the medium; within the lower frequency band portion, the noise portion currently exceeds, at least on average, a predetermined minimum level; and
the noise spectrum has, as well, an upper frequency band portion lying above the reference frequency, and wherein, within the upper frequency band portion, the noise portion currently falls below, at least on average, the predetermined minimum level.

12. The method as claimed in claim 11, wherein:
the step of ascertaining the at least one state value comprises a step of ascertaining the existent reference frequency.

13. The method as claimed in claim 11, wherein:
the step of ascertaining the at least one state value further comprises a step of ascertaining at least one model-parameter distinguishably representing the upper frequency band portion from the lower frequency band portion.

14. The method as claimed in claim 13, wherein:
the step of ascertaining the at least one state value further comprises a step of comparing the existent model-parameter with a reference value predetermined therefor.

15. The method as claimed in claim 13, wherein:
the at least one model-parameter is a gradient value representing a frequency dependent change of a spectral amplitude density of the noise portion.

16. The method as claimed in claim 11, wherein:
the step of ascertaining the at least one state value further comprises a step of comparing the existent model-parameter with a reference value predetermined therefore; and the at least one state value results with application of the existent reference frequency and the model-parameter representing the upper frequency band portion.

17. The method as claimed in claim 1, wherein:
the noise spectrum is band limited.

18. The method as claimed in claim 1, further comprising the step of:
subjecting at least a section of the digital signal to a discrete Fourier transformation.

19. The method as claimed in claim 1, wherein:
the step of ascertaining the noise spectrum further comprises a step of subjecting at least a section of the digital signal to a discrete Fourier transformation.

20. The method as claimed in claim 19, wherein:
the step of ascertaining the noise spectrum further comprises a step of ascertaining a wanted spectrum of the measurement signal corresponding predominantly with the wanted-portion.

21. The method as claimed in claim 1, wherein:
the state value signals that the medium has at least a fluid phase.

22. The method as claimed in claim 1, wherein:
the state value signals that the medium is essentially of one phase.

23. The method as claimed in claim 1, wherein:
the state value signals that the medium is multiphase.

24. The method as claimed in claim 23, wherein:
the state value signals that the medium is essentially two phase.

25. The method as claimed in claim 23, wherein:
the state value signals that the medium has essentially two fluid phases.

26. The method as claimed in claim 23, wherein:
the state value signals that the medium has at least one gaseous phase and one liquid phase.

27. The method as claimed in claim 1, further comprising the step of:
producing, with application of the measurement signal, at least one measured value quantitatively representing a measured variable to be registered for the measured medium.

28. The method as claimed in claim 27, wherein:
the measured value is produced also using the digital signal.

29. The method as claimed in claim 28, wherein:
the measured value is produced with application of the state value.

30. The method as claimed in claim 1, further comprising the step of:
comparing the state value with at least one predetermined state reference value representing a predetermined flow-type of the medium, required for a safe operation and/or a predetermined accuracy of measurement of the flow meter.

31. The method as claimed in claim 30, further comprising the step of:

triggering an alarm based on a comparison of the state value with at least one predetermined state reference value; and the alarm signals, that the currently ascertained flow-type deviates from the predetermined flow-type.

32. The method as claimed in claim 1, wherein:

the step of producing a magnetic field, passing with time-varying intensity at least sectionally through the medium in the measuring tube comprises a step of allowing an electrical, exciter current to flow through an operating circuit of the flow meter as well as through a magnetic field system connected at least temporarily thereto and arranged at the measuring tube.

33. The method as claimed in claim 1, wherein:

The step of ascertaining the noise spectrum of the measurement signal further comprises a step of storing at least a part of the digital, sampling sequence for producing a dataset instantaneously representing the measurement signal as a function of time within a predetermined time interval.

34. The method as claimed in claim 1, wherein:

the magnetic field is a clocked magnetic field; and the measurement voltage is induced in a clocked manner.

35. The method as claimed in claim 1, wherein:

tapping occurs is a clocked manner.

\* \* \* \* \*